United States Patent [19]

Yumiki et al.

[11] Patent Number: 5,347,256

[45] Date of Patent: Sep. 13, 1994

[54] ROTARY TRANSFORMER

[75] Inventors: Naoto Yumiki, Hirakata; Kenji Matsuura, Nara; Akiharu Jinno, Kadoma, all of Japan

[73] Assignee: Matsushita Electric Industrial Co., Ltd., Osaka, Japan

[21] Appl. No.: 870,924

[22] Filed: Apr. 20, 1992

[30] Foreign Application Priority Data

Apr. 26, 1991 [JP] Japan ................... 3-097169

[51] Int. Cl.[5] ................ H01F 15/04; H01F 27/24
[52] U.S. Cl. .................. 336/84 C; 336/120
[58] Field of Search ........... 336/120, 117, 118, 84 C, 336/115, 130, 131

[56] References Cited

U.S. PATENT DOCUMENTS 5,055,775 10/1991 Scherz et al. ............... 336/120

FOREIGN PATENT DOCUMENTS

| 60-163205 | 8/1985 | Japan . | |
|---|---|---|---|
| 61-280607 | 12/1986 | Japan . | |
| 63-13309 | 1/1988 | Japan | 336/120 |
| 63-38224 | 2/1988 | Japan | 336/120 |
| 63-67711 | 3/1988 | Japan | 336/120 |
| 63-246807 | 10/1988 | Japan . | |
| 2010501 | 1/1990 | Japan . | |
| 2-128408 | 5/1990 | Japan | 336/120 |
| 2-177517 | 7/1990 | Japan | 336/120 |
| 355129 | 12/1991 | Japan . | |
| 8806783 | 9/1988 | PCT Int'l Appl. . | |

Primary Examiner—Thomas J. Kozma
Attorney, Agent, or Firm—Stevens, Davis, Miller & Mosher

[57] ABSTRACT

Disclosed is a rotary transformer transmitting signals without any physical contact between its rotary part and its stationary part. In the rotary transformer, cores having different frequency characteristics are integrally combined so that signals having a plurality of different frequency ranges can be selectively transmitted by cores having frequency characteristics optimum for such frequency ranges, thereby improving the signal transmission efficiency and reducing the size of the rotary transformer system.

7 Claims, 5 Drawing Sheets

ROTARY TRANSFORMER

BACKGROUND OF THE INVENTION

1. Field of the Invention

This invention relates to a rotary transformer used in a rotary magnetic head unit having a magnetic head such as that used in, for example, a VTR so as to transmit a signal between a rotary part and a stationary part of the VTR without any physical contact between these parts.

2. Description of the Prior Art

A rotary core and a stationary core having a frequency characteristics most suitable or optimum for a signal to be transmitted for recording and reproduction (which signal will be referred to hereinafter as a record/reproduce signal) and made of a ferrimagnetic material such as a ferrite are disposed opposite to each other while defining a very small gap of about several ten microns between them. Coil grooves are formed on the confronting surfaces of the rotary core and the stationary core respectively. A coil of an electrically conductive material having one to several turns is disposed in the coil groove of the rotary core, and the ends of this coil are connected to a magnetic head which acts to record/reproduce the signal. Similarly, a coil of an electrically conductive material having its number of turns determined according to a predetermined step-up ratio with respect to the coil of the rotary core is disposed in the coil groove of the stationary core, and the ends of this coil are connected to a circuit, etc. mounted on the stationary part.

It is the recent trend that an spparatus such as a highvision TV set or a digital VTR that can record a signal having a very high frequency becomes more and more popular. Therefore, in order to minimize a signal transmission loss which is undesirable, it is a common practice to mount a signal amplifier on the rotary part in the vicinity of the magnetic head so as to amplify the signal reproduced by the magnetic head. As a result, electric power is required for driving the signal amplifier.

Heretofore, a contact type method using a slip ring and a brush has been used to supply required electric power from the stationary part to the rotary part. However, the slip ring and the brush contacting each other generates pulse-shaped low-frequency noise called brushing noise that adversely affects the picture quality. Also, the slip ring and the brush are subjected to heavy wear. Further, with the increase in the rotation speed, the phenomena described above tend to become more and more marked. Therefore, another rotary transformer of a non-physical contact type is recently used for the purpose of electric power signal transmission too. That is, a rotary transformer having its frequency response different from that of the record/reproduce signal transmission purpose rotary transformer is located at a specific position different from the position of the latter rotary transformer.

The operation of the rotary transformers constructed as described above will now be described.

In the signal record mode, a recording signal is supplied to the coil of the stationary core of the record/reproduce signal transmission purpose rotary transformer, so that a magnetic flux path is formed between the stationary core and the rotary core. As a result, a voltage is induced in the coil of the rotary core due to mutual induction, and the signal is transmitted from the stationary core to the rotary core not physically contacting the stationary core.

In the signal playback mode, a reproduced signal induced by the magnetic head is supplied to the coil of the rotary core in a relation contrary to the record mode, and a voltage is induced in the coil of the stationary core by mutual induction too, so that the signal is transmitted from the rotary part to the stationary part without any physical contact between them. Further, in order to supply electric power to the signal amplifier on the rotary part from the stationary part by the electric power signal transmission purpose rotary transformer, this electric power signal is converted into a direct current by a direct current converter mounted similarly on the rotary part and drives the signal amplifier.

However, the prior art construction has had various problems as will be pointed out now.

(1). The record/reproduce signal transmission purpose rotary transformer and the electric power signal transmission purpose rotary transformer must be separately provided. Therefore, connecting members which are twice as many as those used hitherto will be required so that coils led from the cores are to be connected to the circuit, etc. Thus, the overall construction will not meet the requirement for the size reduction, and the degree of freedom of the system design will be quite lowered. Also, the cost will be inevitably increased.

(2). When the record/reproduce signal having a high frequency and a low signal level and the electric power signal having a low frequency and a high signal level are transmitted by the use of the same kind of cores, the frequency characteristics of the cores is necessarily limited to a certain predetermined value, and those signals having substantially the same frequency range can only be efficiently transmitted. Therefore, even when it is desired to use the same kind of cores for the transmission of a plurality of signals having extremely different frequency ranges, such as, the record/reproduce signal and the electric power signal, it becomes difficult to efficiently transmit one of these signals because the frequency characteristics of the cores are not optimized to deal with both of these signals.

SUMMARY OF THE INVENTION

It is therefore an object of the present invention to provide a rotary transformer in which a plurality of signals having extremely different frequency ranges, such as, a record/reproduce signal and an electric power signal can be efficiently transmitted by means of cores having optimized frequency characteristics for the respective signals.

Another object of the present invention is to provide a rotary transformer in which the degree of freedom of system design is increased so as to attain the size reduction together with the cost reduction.

The present invention provides a rotary transformer comprising a plurality of core pairs each consisting of a rotary core and a stationary core disposed so as to be coaxially rotatable relative to each other while dafining a very small air gap therebetween thereby forming a magnetic circuit, a plurality of coil pairs mounted on the confronting surfaces respectively of the plural core pairs, and combining means combining the plural core pairs in the axial or radial direction, the core pairs located adjacent to each other among the plural core pairs having frequency characteristics different from each other.

Because of the construction of the rotary transformer of the present invention, two or more kinds of signals having respectively different frequency ranges can be transmitted by the use of cores having frequency characteristics optimum for the individual frequencies. Thus, the signal transmission efficiency can be improved, and the desired reduction of the size of the system can be achieved.

DESCRIPTION OF THE PREFERRED EMBODIMENTS

A first embodiment of the rotary transformer according to the present invention will now be described by reference to FIG. 1, 2, 6 and 7.

Figure 1:
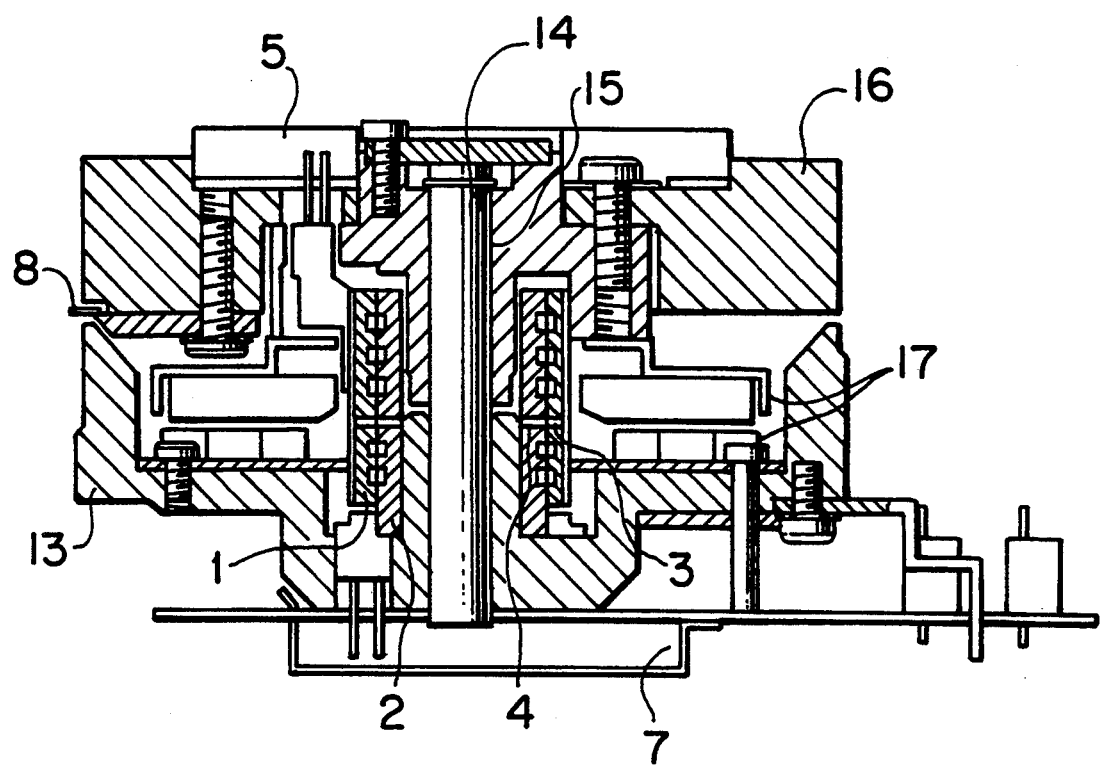
FIG. 1 is a longitudinal sectional view of a rotary magnetic head unit to which the present invention is applied.
Figure 2:
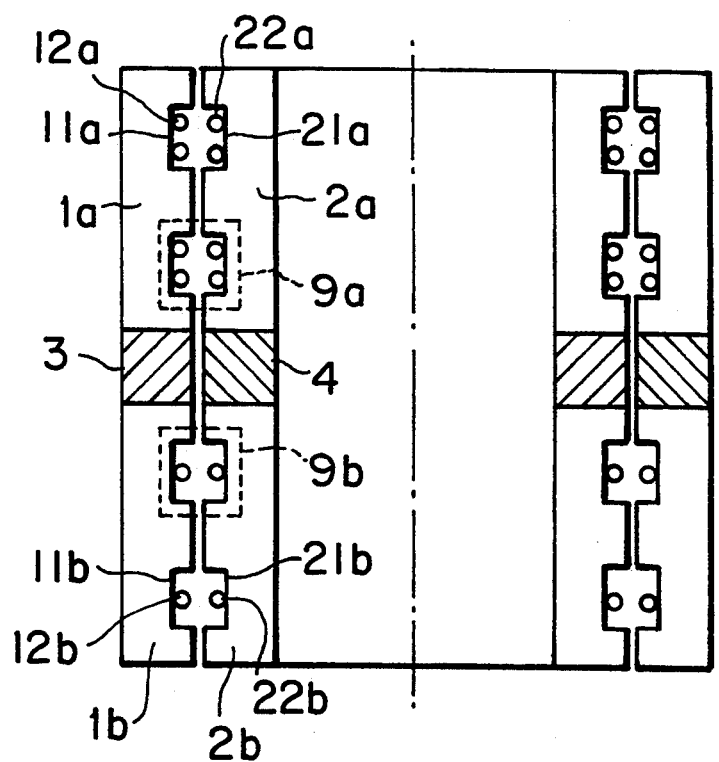
FIG. 2 is a schematic longitudinal sectional view of a first embodiment of the present invention which is a cylindrical type rotary transformer having two core pairs.

Referring to FIG. 1 and 2, a shaft 14 is fixed to a lower cylinder 13. An upper cylinder 16 is rotatable around the shaft 14 through a bearing 15. A magnetic head 8 is fixed to the upper cylinder 16 so as to record-/reproduce a signal. A motor 17 drives to rotate the upper cylinder 16. Rotary cores 1a and 1b of the cylindrical type rotary transformer are fixed to the upper cylinder 16. Stationary cores 2a and 2b are fixed to the lower cylinder 13. The rotary cores 1a, 1b and the stationary cores 2a, 2b are coaxially disposed while defining a very small air gap between them, and the rotary cores 1a and 1b can rotate relative to the stationary cores 2a and 2b with the rotation of the upper cylinder 16. Both the rotary cores 1a, 1b and the stationary cores 2a, 2b are made of a ferrimagnetic material such as a ferrite.

Figure 6:
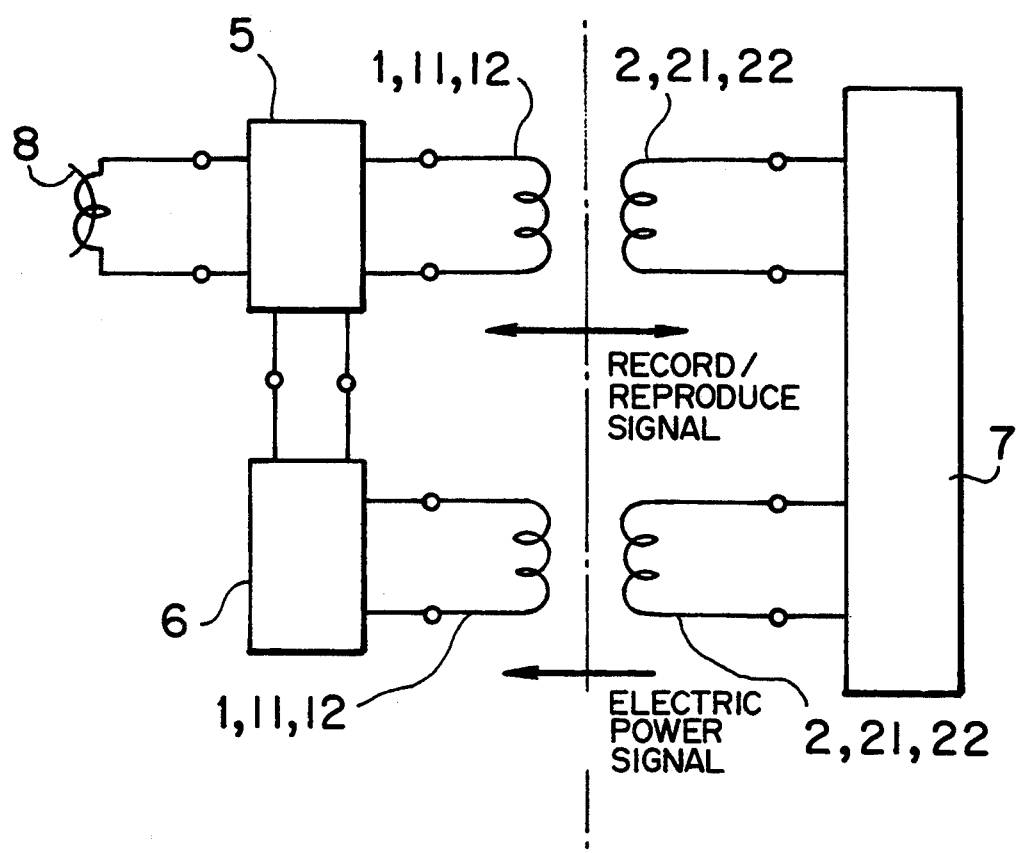
FIG. 6 is a connection diagram of a rotary transformer and associated circuits.
Figure 7:
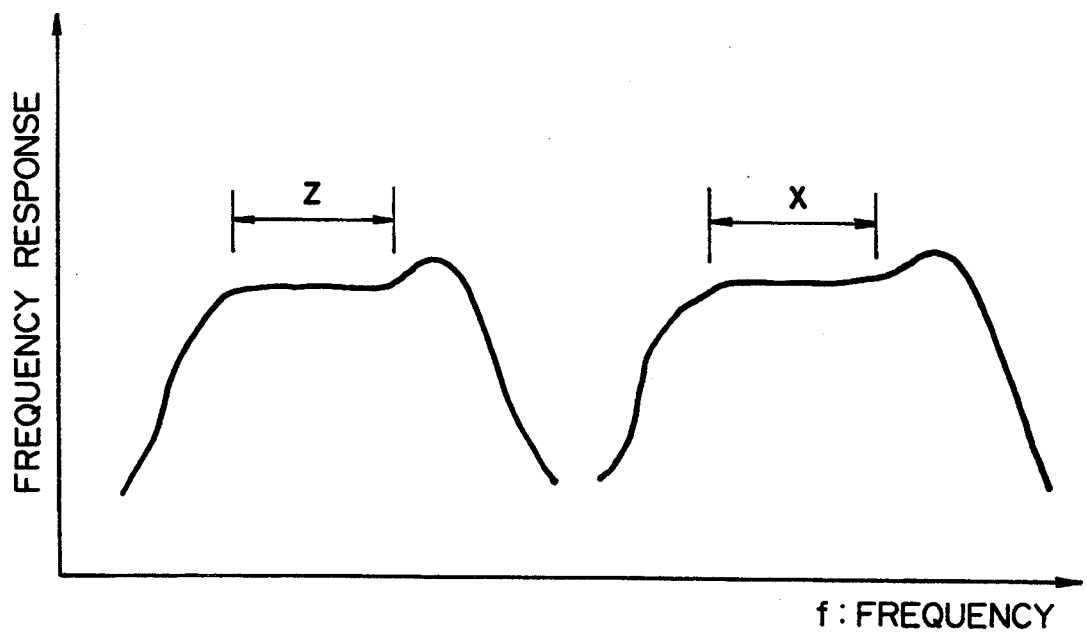
FIG. 7 is a graph showing two kinds of frequency responses of the rotary transformer.

Generally, in a rotary transformer circuit system, the frequency response representing the ratio of an output signal to an input signal is substantially determined by the frequency characteristic of a core, as shown in FIG. 6. Therefore, by optimizing the frequency characteristic (for example, the permeability $\mu$) of the core, the frequency response of the rotary transformer with respect to a signal having a specific frequency can be optimized. FIG. 7 is a graph showing the frequency response of the record/reproduce signal transmission purpose rotary transformer using the combination of the rotary core 1a and the stationary core 2a. As shown in FIG. 7, the frequency response of the rotary transformer is optimum in a high frequency range x (f=about 100 to 200 MHz), and a material (for example, Ni ferrite whose $\mu$ is about 50) showing a flat frequency response for the frequency in the high frequency range x is used to form the cores 1a and 2a. Also, as shown in FIG. 7, the frequency response of the electric power signal transmission purpose rotary transformer using the combination of the rotary core 1b and the stationary core 2b is optimum in a low frequency range z (f=about 20 kHz), and a material (for example, Mn $-$Zn ferrite whose $\mu$ is about 1000) is used to form the cores 1b and 2b.

Coil grooves 11a, 11b and coil grooves 21a, 21b are formed on the confronting surfaces of the rotary cores 1a, 1b and the stationary cores 2a, 2b, respectively. Coils 12a and 12b having a predetermined number of turns and made of an electrically conductive material are wound in the coil grooves 11a and 11b of the rotary cores 1a and 1b respectively. Similarly, coils 22a and 22b made of an electrically conductive material are wound in the coil grooves 21a and 21b of the stationary cores 2a and 2b respectively. These coils 22a and 22b have a predetermined turns ratio with respect to the coils 12a and 12b.

The rotary cores 1a and 1b are axially integrally bonded together by a combining member 3 of an electrically conductive material to be electrically connected in common to the ground. Similarly, the stationary cores 2a and 2b are also axially bonded together by a combining member 4 of an electrically conductive material to be electrically connected in common to the ground. A signal amplifier 5 is mounted on the rotary part so as to amplify a very small reproduced signal induced by the magnetic head 8, and the coil 12a of the rotary core 1a is connected at its ends to the signal amplifier 5. A direct current converter 6 converts the electric power signal into a direct current, and the coil 12b of the stationary core 2b is connected at its ends to the converter 6, so that the direct current signal is supplied to the signal amplifier 5. A stationary amplifier 7 is connected to the ends of the coils 22a and 22b of the respective stationary cores 2a and 2b.

The operation of the rotary transformer having the above construction will now be described.

In the signal record mode, a recording current having a frequency belonging to the frequency range x (f=about 100 to 200 MHz) is supplied to the coil 22a of the stationary core 2a, so that a magnetic flux path 9a is formed between the stationary core 2a and the rotary core 1a provided for the record/reproduce signal transmission purpose. As a result, a voltage is induced in the coil 12a of the rotary core 1a by mutual induction, so that the signal is transmitted to the rotary part from the stationary part without any physical contact between them.

In the signal playback mode, electric power for driving the signal amplifier 5 is transmitted by the combination of the rotary core 1b and the stationary core 2b provided for the electric power signal transmission purpose. When the electric power signal belonging to the frequency range z (f=about 20 kHz) is supplied to the coil 22b of the stationary core 2b, a magnetic flux path 9b is formed between the stationary core 2b and the rotary core 1b. As a result, a voltage is induced in the coil 12b of the rotary core 1b by mutual induction, so that the signal is transmitted to the rotary part from the stationary part without any physical contact between them. The electric power signal transmitted to the rotary part is converted into the corresponding direct current signal which drives the signal amplifier 5. The very small reproduced signal induced by the magnetic head 8 is amplified by the signal amplifier 5, and the amplified signal is supplied to the coil 12a of the rotary core 1a. As a result, a voltage is induced in the coil 22a of the stationary core 2a by mutual induction, so that the signal is transmitted to the stationary part from the rotary part without any physical contact between them.

The signals simultaneously transmitted through the record/reproduce signal transmission channel and the electric power signal transmission channel respectively have greatly different signal levels. Therefore, these signals may interfere with each other, and crrosstalk between the channels may result. However, in the illustrated construction, the magnetic flux paths 9 are completely cut off because the electrically conductive combining members 3 and 4 are electrically connected in common to the ground. Accordingly, the signal being transmitted through one of the channels in the signal transmission mode does not adversely affect the other signal being transmitted through the other channel, and no crosstalk between the channels can occur.

Figure 3:
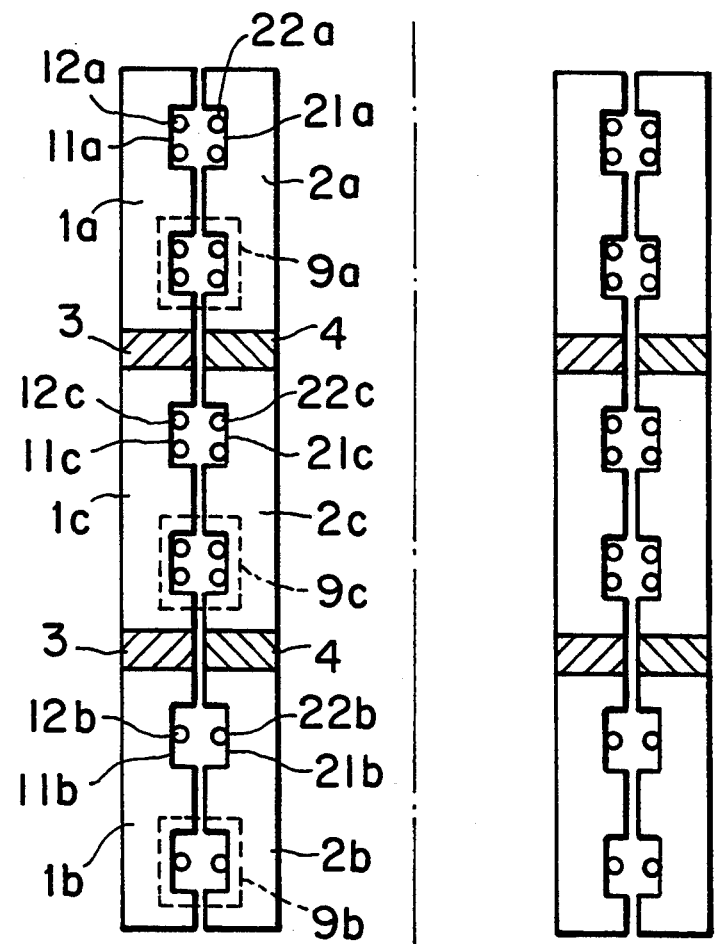
FIG. 3 is a schematic longitudinal sectional view of a second embodiment of the present invention which is a cylindrical type rotary transformer having three core pairs.
Figure 8:
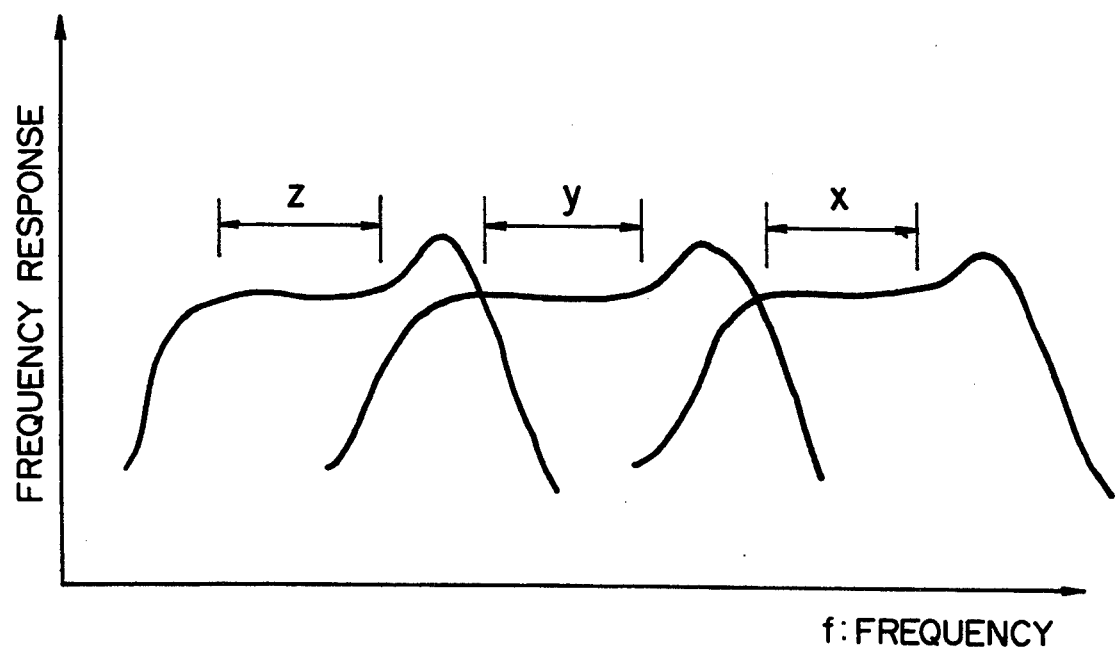
FIG. 8 is a graph showing three kinds of frequency responses of the rotary transformer.

A second embodiment of the rotary transformer according to the present invention will now be described by reference to FIG. 3, 6 and 8. In this second embodiment, like reference numerals are used to designate like parts of the first embodiment so as to dispense with repetition of the same description.

Rotary cores 1a, 1b and 1c of the cylindrical rotary transformer are fixed to an upper cylinder 16. Stationary cores 2a, 2b and 2c are fixed to a lower cylinder 13. The rotary cores 1a, 1b, 1c and the stationary cores 2a, 2b, 2c are coaxially arranged while defining a very small air gap therebetween respectively, and the rotary cores 1a, 1b, 1c can rotate relative to the stationary cores 2a, 2b, 2c. The rotary cores 1a, 1b and 1c and the stationary cores 2a, 2b, 2c are made of a ferrimagnetic material such as a ferrite. The frequency response of a record/reproduce signal transmission purpose rotary transformer using the combination of the rotary core 1a and the stationary core 2a is optimum in a high frequency range x (f=about 100 to 200 MHz) as shown in FIG. 8. The rotary core 1a and the stationary core 2a are made of a material (for example, Ni ferrite whose $\mu$ is about 50) showing a flat frequency response with respect to a frequency in this frequency range x. The frequency response of another record/reproduce signal transmission purpose rotary transformer using the combination of the rotary core 1c and the stationary core 2c is optimum in an intermediate frequency range y (f=about 1 to 50 MHz) which is slightly lower than the frequency range x, as shown in FIG. 8. The rotary core 1c and the stationary core 2c are made of a material (for example, a mixture prepared by mixing Ni-Zn ferrite with Cu-Mg-Mn ferrite and whose $\mu$ is about 500) showing a flat frequency response with respect to a frequency in this frequency range y. Also, the frequency response of an electric power signal transmission purpose rotary transformer using the combination of the rotary core 1b and the stationary core 2b is optimum in a low frequency range z (f=about 20 kHz). The rotary core 1b and the stationary core 2b are made of a material (for example, Mn-Zn ferrite whose $\mu$ is about 1000) showing a flat frequency response with respect to a frequency in this frequency range z which is considerably lower than the frequency range x.

Coil grooves 11a, 11b, 11c and coil grooves 21a, 21b, 21c are formed on the confronting surfaces of the rotary cores 1a, 1b, 1c and the stationary cores 2a, 2b, 2c, respectively. Coils 12a, 12b, 12c made of an electrically conductive material and having a predetermined number of turns are wound in the coil grooves 11a, 11b, 11c of the rotary cores 1a, 1b, 1c, respectively. Similarly, coils 22a, 22b, 22c made of an electrically conductive material are wound in the coil grooves 21a, 21b, 21c of the stationary cores 2a, 2b, 2c, respectively. These coils 22a, 22b and 22c have a predetermined turns ratio with respect to the coils 12a, 12b and 12c of the rotary cores 1a, 1b and 1c respectively. The rotary cores 1a, 1c and the rotary cores 1c, 1b are axially integrally bonded together by combining members 3 of an electrically conductive material respectively to be electrically connected in common to the ground. Similarly, the stationary cores 2a, 2c and the stationary cores 2c, 2b are axially integrally bonded together by combining members 4 of an electrically conductive material respectively to be also electrically connected in common to the ground.

A signal amplifier 5 is mounted on the rotary part so as to amplify a very small reproduced signal induced by a magnetic heads 8a, 8c and the ends of the coils 12a and 12c of the rotary cores 1a and 1c are connected to the signal amplifier 5. A direct current converter 6 converts the electric power signal into the corresponding direct current and is connected to the ends of the coil 12b of the rotary core 1b so as to supply the direct current signal to the signal amplifier 5. A stationary amplifier 7 is connected to the ends of the coils 22a, 22b and 22c of the respective stationary cores 2a, 2b and 2c.

The operation of the rotary transformer having the above construction will now be described.

In the signal record mode, a recording signal having a frequency belonging to the frequency range x (f =about 100 to 200 MHz) is supplied to the coil 22a of the stationary core 2a, and a magnetic flux path 9a is formed between the stationary core 2a and the rotary core 1a forming the record/reproduce signal transmission purpose rotary transformer. As a result, a voltage is induced in the coil 12a of the rotary core 1a by mutual induction, so that the signal is transmitted to the rotary part from the stationary part without any physical contact between them.

Also, when a recording signal having a frequency belonging to the frequency range y (f=about 1 to 50 MHz) is supplied to the coil 22c of the stationary core 2c, a magnetic flux path 9c is formed between the stationary core 2c and the rotary core 1c forming another record/reproduce signal transmission purpose rotary transformer. As a result, a voltage is induced in the coil 12c of the rotary core 1c, so that the signal is transmitted to the rotary part from the stationary part without any physical contact between them.

In the signal playback mode, electric power for driving the signal amplifier 5 is transmitted by the combination of the rotary core 1b and the stationary core 2b forming the electric power signal transmission purpose rotary transformer. When an electric power signal having a frequency belonging to the frequency range z (f=about 20 kHz) is supplied to the coil 22b of the stationary core 2b, a magnetic flux path 9b is formed between the stationary core 2b and the rotary core 1b. As a result, a voltage is induced in the coil 12b of the rotary core 1b, so that the signal is transmitted from the stationary part to the rotary part without any physical contact between them. The electric power signal transmitted to the rotary part is converted into the corresponding direct current by the direct current converter 6 to drive the signal amplifier 5. A very small reproduced signal induced by the magnetic head 8 is amplified by the signal amplifier 5, and this signal (f=about 100 to 200 MHz) is supplied to the coil 12a of the rotary core 1a. As a result, a voltage is also induced in the coil 22a of the stationary core 2a, so that the signal is transmitted to the stationary part from the rotary part without any physical contact between them.

Similarly, a very small reproduced signal induced by the magnetic head 8c is amplified by the signal amplifier and this signal (f=about 1 to 50 MHz) is supplied to the coil 12c of the rotary core 1c, and a voltage is induced in the coil 22c of the stationary core 2c by mutual induction, so that the signal is transmitted to the stationary part from the rotary part without any physical contact between them.

The signals simultaneously transmitted through the record/reproduce signal transmission channel and the electric power signal transmission channel have greatly different signal levels. These signals may interfere with each other, and crosstalk therebetween may occur. However, in the illustrated construction, the electrically conductive combining members 3 and 4 are connected in common to the ground, so that the magnetic flux paths 9a, 9c are completely cut off. Therefore, the signal being transmitted through one of the channels in the signal transmission mode does not adversely affect the signal being transmitted through the other channel, so that no crosstalk can occur between the transmission channels.

A third embodiment of the rotary transformer according to the present invention will now be described by reference to FIGS. 4, 6 and 7. In this third embodiment, like reference numerals are used to designate like parts of the first embodiment to dispense with repetition of the same description.

Figure 4:
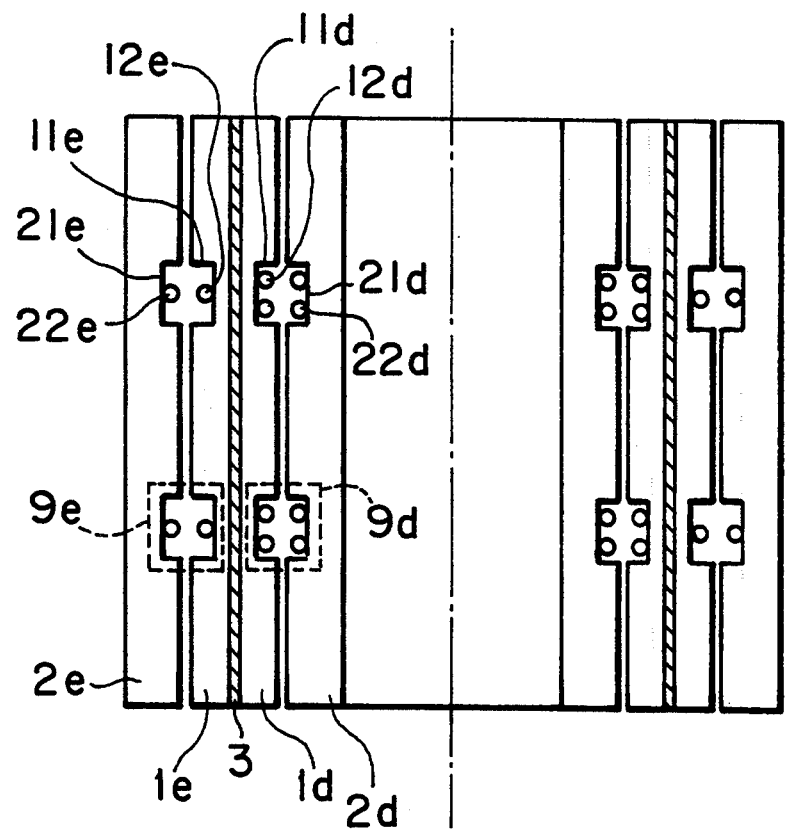
FIG. 4 is a schematic longitudinal sectional view of a third embodiment of the present invention which is a cylindrical type rotary transformer having two signal transmission purpose air gaps.

Referring to FIG. 4, an inner rotary core 1d and an outer rotary core 1e of the cylindrical type rotary transformer are fixed to an upper cylinder 16. An inner stationary core 2d and an outer stationary core 2e are fixed to a lower cylinder 13. The integrally arranged rotary cores 1d, 1e and stationary cores 2d, 2e are coaxially disposed while defining a very small air gap therebetween respectively, and the rotary cores 1d, 1e are rotatable relative to the stationary cores 2d, 2e with the rotation of the upper cylinder 16. All of these rotary cores 1d, 1e and stationary cores 2d, 2e are made of a ferrimagnetic material such as a ferrite.

The frequency characteristics of a record/reproduce signal transmission purpose rotary transformer using the combination of the inner rotary core 1d and the inner stationary core 2d is optimum in a high frequency range x (f=about 100 to 200 MHz) as shown in FIG. 7. These cores 1d and 2d are made of a material (for example, Ni ferrite whose $\mu$ is about 50) showing a flat frequency characteristics in this frequency range x. Also, the frequency characteristics of an electric power signal transmission purpose rotary transformer using the combination of the outer rotary core 1e and the outer stationary core 2e is optimum in a low frequency range z (f=about 20 kHz) as shown in FIG. 7. These cores 1e and 2e are made of a material (for example, Mn-Zn ferrite whose $\mu$ is about 1000) showing a flat frequency characteristics in the frequency range z considerably lower than the frequency range x.

Coil grooves 11d and 11e are formed on the confronting surfaces of the inner rotary core 1d and the inner stationary core 2d, and coil grooves 21d and 21e are formed on the confronting surfaces of the outer rotary core 1e and the outer stationary core 2e, respectively. Coils 12d and 12e of an electrically conductive material having a predetermined number of turns are wound in the coil grooves 11d and 11e of the rotary cores 1d and 1e respectively. Similarly, coils 22d and 22e of an electrically conductive material having a predetermined turns ratio with respect to the coils 12d and 12e are wound in the coil grooves 21d and 21e of the stationary cores 2d and 2e respectively.

The rotary core 1d and 1e are radially integrally bonded together by a combining member 3 of an electrically conductive material to be connected in common to the ground. Because the signal transmitted by the record/reproduce signal transmission purpose rotary transformer has the high frequency, it is necessary to decrease the resistance per a certain number of turns of the coils so as to increase the resonance frequency. Therefore, the cores used to form the record/reproduce signal transmission purpose rotary transformer have the smaller inner diameters. A signal amplifier 5 is mounted on the rotary part so as to amplify a very small reproduced signal induced by a magnetic head 8 and is connected to the ends of the coil 12d of the inner rotary core 1d. A direct current converter 6 converts the electric power signal into the corresponding direct current and is connected to the ends of the coil 12e of the stationary core 2e so as to supply the direct current signal to the signal amplifier 5. A stationary amplifier 7 is connected to the ends of the coils 22d and 22e of the stationary core 2d and 2e respectively.

The operation of the rotary transformer having the above construction will now be described.

In the signal record mode, a recording current having a frequency belonging to the frequency range x (f=about 100 to 200 MHz) is supplied to the coil 22d of the inner stationary core 2d, so that a magnetic flux path 9d is formed between the inner stationary core 2d and the inner rotary core 1d. As a result, a voltage is induced in the coil 12d of the inner rotary core 1d, and the signal is transmitted to the rotary part from the stationary part without any physical contact between them.

In the signal playback mode, electric power for driving the signal amplifier 5 is transmitted by the combination of the outer rotary core 1e and the outer stationary core 2e provided for the electric power signal transmission purpose. When the electric power signal having a frequency belonging to the frequency range z (f=about 20 kHz) is supplied to the coil 22e of the outer stationary core 2e, a magnetic flux path 9e is formed between the outer stationary core 2e and the outer rotary core 1e. As a result, a voltage is induced in the coil 12e of the outer rotary core 1e by mutual induction, so that the signal is transmitted to the rotary part from the stationary part without any physical contact between them. The electric power signal transmitted to the rotary part is converted into the direct current signal by the direct current signal converter 6 to drive the signal amplifier 5. The very small reproduced signal induced by the magnetic head 8 is amplified by the signal amplifier 5, and this amplified signal is supplied to the coil 12d of the inner rotary core 1d. As a result, a voltage is also induced in the coil 22d of the inner stationary core 2d by mutual induction, so that the signal is transmitted to the stationary part from the rotary part without any physical contact between them.

The signals simultaneously transmitted through the record/reproduce signal transmission channel and the electric power signal transmission channel have greatly different signal levels. Thus, these signals may interfere with each other, and crosstalk between these channels may result. However, in the illustrated construction, the electrically conductive combining member 3 is connected in common to the ground, so that the magnetic paths 9d, 9e are completely cut off. Therefore, the signal being transmitted through one of the channels at the time of signal transmission does not adversely affect the signal being transmitted through the other channel, and no crosstalk between the channels can occur.

The third embodiment of the present invention described above has referred only to the case where the number of the air gaps between the cores used for the signal transmission is two. However, it is apparent that the number of these air gaps is three or more.

Figure 5:
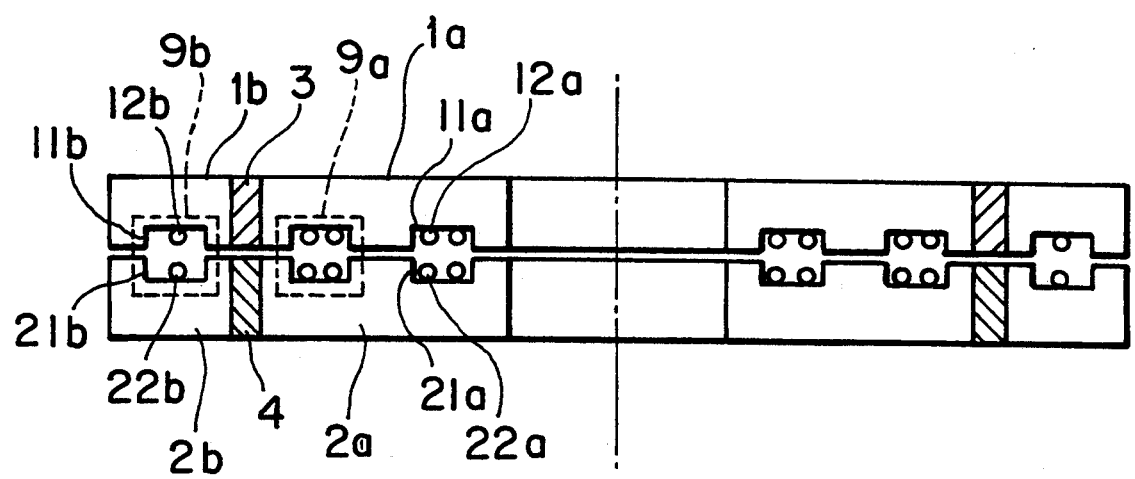
FIG. 5 is a schematic longitudinal sectional view of a fourth embodiment of the present invention which is a flat type rotary transformer.

A fourth embodiment of the rotary transformer according to the present invention will now be described by reference to FIGS. 5, 6 and 7. In this fourth embodiment, like reference numerals are used to designate like parts of the first embodiment so as to dispense with repetition of the same description.

Rotary cores 1a and 1b of the flat type rotary transformer are fixed to an upper cylinder 16. Stationary cores 2a and 2b of the rotary transformer are fixed to a lower cylinder 13. The rotary cores 1a, 1b and the stationary cores 2a, 2b are coaxially arranged while defining a very small air gap between them, and the rotary cores 1a, 1b are rotatable relative to the stationary cores 2a, 2b with the rotation of the upper cylinder 16. These rotary cores 1a, 1b and stationary cores 2a, 2b are made of a ferrimagnetic material such as a ferrite.

The frequency response of a record/reproduce signal transmission purpose rotary transformer using the combination of the rotary core 1a and the stationary core 2a is optimum in a high frequency range x (f=about 100 to 200 MHz) as shown in FIG. 7. These cores 1a and 2a are made of a material (for example, Ni ferrite whose $\mu$ is about 50) showing a flat frequency response in this frequency range x. Also, the frequency response of an electric power signal transmission purpose rotary transformer using the combination of the rotary core 1b and the stationary core 2b is optimum in a low frequency range z (f=about 20 kHz) which is considerably lower than the frequency range x. These cores 1b and 2b are made of a material (for example, Mn-Zn ferrite whose $\mu$ is about 1000) showing a flat frequency response in this frequency range z.

Coil grooves 11a, 11b and coil grooves 21a, 21b are formed on the confronting surfaces of the rotary cores 1a, 1b and the stationary cores 2a, 2b respectively. Coils 12a and 12b made of an electrically conductive material and having a predetermined number of turns are wound in the coil grooves 11a and 11b of the rotary cores 1a and 1b respectively. Similarly, coils 22a and 22b made of an electrically conductive material and having a predetermined turns ratio with respect to the coils 12a and 12b of the rotary cores 1a and 1b are wound in the coil grooves 21a and 21b of the stationary cores 2a and 2b respectively.

The rotary cores 1a and 1b are radially integrally bonded together by a combining member 3 of an electrically conductive material to be electrically connected in common to the ground. Similarly, the stationary cores 2a and 2b are radially integrally bonded together by a combining member 4 of an electrically conductive material to be electrically connected in common to the ground. Because the signal having the high frequency is transmitted through the record/reproduce signal transmission purpose rotary transformer, it is necessary to decrease the resistance per a certain number of turns of the coils so as to increase the resonance frequency. Therefore, the cores used to form this rotary transformer have the smaller inner diameters.

A signal amplifier 5 is mounted on the rotary part so as to amplify a very small reproduced signal induced by a magnetic head 8 and is connected to the ends of the coil 12a of the rotary core 1a. A direct current converter 6 converts the electric power signal into the corresponding direct current and is connected to the ends of the coil 12b of the rotary core 1b so as to supply the direct current signal to the signal amplifier 5. A stationary amplifier 7 is connected to the ends of the coils 22a and 22b of the respective stationary cores 2a and 2b.

The operation of the rotary transformer having the above construction will now be described.

In the signal record mode, a recording current having a frequency belonging to the frequency range x (f=about 100 to 200 MHz) is supplied to the coil 22a of the stationary core 2a, so that a magnetic flux path 9a is formed between the stationary core 2a and the rotary core 1a. As a result, a voltage is induced in the coil 12a of the rotary core 1a so that the signal is transmitted to the rotary part from the stationary part without any physical contact between them.

In the signal playback mode, electric power for driving the signal amplifier 5 is transmitted by the combination of the rotary core 1b and the stationary core 2b provided for the purpose of electric power transmission. An electric power signal having a frequency belonging to the frequency range z (f=about 20 kHz) is supplied to the coil 22a of the stationary core 2a, so that a magnetic flux path 9b is formed between the stationary core 2b and the rotary core 1b. As a result, a voltage is induced in the coil 12b of the rotary core 1b by mutual induction, so that the signal is transmitted to the rotary part from the stationary part without any physical contact between them. The electric power signal transmitted to the rotary part is converted into the corresponding direct current signal by the direct current converter 6 so as to drive the signal amplifier 5. The reproduced signal induced by the magnetic head 8 is amplified by the signal amplifier 5, and this amplified signal is supplied to the coil 12a of the rotary core 1a. As a result, a voltage is also induced in the coil 22a of the stationary core 2a by mutual induction, so that the signal is transmitted to the stationary part from the rotary part without any physical contact between them.

The signals simultaneously transmitted through the record/reproduce signal transmission channel and the electric power signal transmission channel have greatly different signal levels. Thus, these signals may interfere with each other, and crosstalk between these channels may occur. However, in the illustrated construction, the electrically conductive combining members 3 and 4 are electrically connected in common to the ground, so that the magnetic flux paths 9 are completely cut off. Therefore, the signal being transmitted through one of the channels at the time of signal transmission does not adversely affect the signal being transmitted through the other channel, and no crosstalk between the channels can occur.

What is claimed is:

1. A rotary transformer comprising:

a plurality of core pairs, each including a rotary core and a stationary core disposed so as to be coaxially rotatable relative to each other while defining a very small air gap therebetween thereby forming a magnetic circuit, at least one of said core pairs having a different frequency characteristic and permeability from that of at least one other of said core pairs;

a plurality of coil pairs respectively mounted in grooves formed on confronting, surfaces of said core pairs; and combining means for combining said plural core pairs in the axial or radial direction, said combining means comprising an electrically conductive material.

2. A rotary transformer according to claim 1, wherein said rotary core and said stationary core have approximately identical frequency characteristics and permeability.

3. A rotary transformer according to claim 1, wherein said at least one of said core pairs is made of Mn-Zn ferrite, and wherein said at least one other of said core pairs is made of Ni ferrite.

4. A rotary transformer according to claim 1, wherein said rotary transformer is a radial rotary transformer, and wherein said at least one of said core pairs is disposed in a radially outermost position of said plurality of core pairs and has a permeability larger than a permeability of said at least one other of said core pairs in a frequency range lower than a predetermined frequency, whereby said at least one of said core pairs is particularly suited to transmit a low frequency signal.

5. A rotary transformer according to claim 4, wherin said rotary core and said stationary core have approximately identical frequency characteristics and permeability.

6. A rotary transformer according to claim 4, wherein said at least one of said core pairs is made of Mn-Zn ferrite, and wherein said at least one other of said core pairs is made of Ni ferrite.

7. A rotary transformer according to claim 1, wherein said combining means is electrically grounded.

* * * * *